US012483989B2

(12) United States Patent
Joh et al.

(10) Patent No.: US 12,483,989 B2
(45) Date of Patent: Nov. 25, 2025

(54) METHOD FOR DYNAMICALLY APPLYING BATTERY SAVING TECHNOLOGY, TERMINAL AND NETWORK APPARATUS IMPLEMENTING THE METHOD

(71) Applicant: KT Corporation, Seongnam-si (KR)

(72) Inventors: Han-Jin Joh, Seongnam-si (KR); Hyung-Jin Lee, Seoul (KR); Youn-Pil Jeung, Bucheon-si (KR)

(73) Assignee: KT Corporation, Seongnam-si (KR)

( * ) Notice: Subject to any disclaimer, the term of this patent is extended or adjusted under 35 U.S.C. 154(b) by 634 days.

(21) Appl. No.: 17/800,399

(22) PCT Filed: Feb. 15, 2021

(86) PCT No.: PCT/KR2021/001881
§ 371 (c)(1),
(2) Date: Aug. 17, 2022

(87) PCT Pub. No.: WO2021/167300
PCT Pub. Date: Aug. 26, 2021

(65) Prior Publication Data
US 2023/0269667 A1 Aug. 24, 2023

(30) Foreign Application Priority Data
Feb. 17, 2020 (KR) .......... 10-2020-0018943

(51) Int. Cl.
*H04W 52/02* (2009.01)
*H04W 72/0446* (2023.01)
*H04W 76/28* (2018.01)

(52) U.S. Cl.
CPC ... *H04W 52/0261* (2013.01); *H04W 52/0216* (2013.01); *H04W 76/28* (2018.02); *H04W 72/0446* (2013.01)

(58) Field of Classification Search
CPC ......... H04W 52/0261; H04W 52/0216; H04W 76/28; H04W 52/0229; H04W 52/0264;
(Continued)

(56) References Cited

U.S. PATENT DOCUMENTS

2010/0240419 A1 9/2010 Horino
2011/0038348 A1* 2/2011 Borsella ................. G10H 1/361
370/328

(Continued)

FOREIGN PATENT DOCUMENTS

CN 101459905 A 6/2009
CN 108370593 A 8/2018
(Continued)

OTHER PUBLICATIONS

International Search Report for PCT/KR2021/001881 dated, Jun. 24, 2021 (PCT/ISA/210).
(Continued)

*Primary Examiner* — Faruk Hamza
*Assistant Examiner* — Aixa A Guadalupe Cruz
(74) *Attorney, Agent, or Firm* — Sughrue Mion, PLLC

(57) ABSTRACT

A method for dynamically applying a battery saving technology by a terminal is disclosed. The method comprises transmitting a first message requesting an activation of a battery saving technology dynamic service to an authentication server, receiving a second message being a response to the first message from the authentication server, transmitting and receiving data with a base station in a battery saving technology deactivated state, when response information included in the second message comprises authentication success, and at least one application included in the second message is running, and maintaining a battery saving technology activated state when the application included in the second message is not running.

20 Claims, 8 Drawing Sheets

(58) Field of Classification Search
CPC ...... Y02D 30/70; H04M 1/724; H04M 1/725; H04M 1/73; H04M 3/42
See application file for complete search history.

(56) References Cited

U.S. PATENT DOCUMENTS

| | | | | |
|---|---|---|---|---|
| 2012/0207069 | A1* | 8/2012 | Xu | .................... H04W 52/0222 370/311 |
| 2015/0365995 | A1* | 12/2015 | Tabet | .................... H04W 76/28 370/311 |
| 2017/0295608 | A1* | 10/2017 | Li | .................... H04W 52/0216 |
| 2018/0302813 | A1 | 10/2018 | Hahn et al. | |
| 2019/0215773 | A1 | 7/2019 | Ljung | |
| 2020/0260377 | A1* | 8/2020 | Jin | .................... H04W 72/0446 |

FOREIGN PATENT DOCUMENTS

| | | |
|---|---|---|
| JP | 6201993 B2 | 9/2017 |
| KR | 10-2010-0092015 A | 8/2010 |
| KR | 10-2015-0067770 A | 6/2015 |
| KR | 10-2016-0002240 A | 1/2016 |
| KR | 10-1746191 B1 | 1/2016 |
| KR | 10-2016-0026377 A | 3/2016 |
| KR | 10-2016-0142893 A | 12/2016 |
| KR | 10-1689013 B1 | 12/2016 |
| KR | 10-2017-0100627 A | 9/2017 |
| WO | 2016/137475 A1 | 9/2016 |
| WO | 2017/003064 A1 | 1/2017 |

OTHER PUBLICATIONS

Office Action issued Mar. 28, 2025 in Chinese Patent Application No. 202180027551.5.

Zhu Qin, and Li Xiaowen, "Improvement and Implementation of DRX in TD-LTE System", Telecommunications Science 29.6 (2013), Key Laboratory of Mobile Communication Technology, Chongqing University of Posts and Telecommunication, Jun. 2013, pp. 110-114 (6 pages total).

Notice of Allowance dated Sep. 12, 2025, issued by the Chinese Patent Office in Chinese Patent Application No. 202180027551.5.

* cited by examiner

METHOD FOR DYNAMICALLY APPLYING BATTERY SAVING TECHNOLOGY, TERMINAL AND NETWORK APPARATUS IMPLEMENTING THE METHOD

CROSS REFERENCE TO RELATED APPLICATIONS

This application is a National Stage of International Application No. PCT/KR2021/001881 filed Feb. 15, 2021, claiming priority based on Korean Patent Application No. 10-2020-0018943 filed Feb. 17, 2020, the disclosures of which are incorporated by reference in their entireties.

TECHNICAL FIELD

The present invention relates to a battery saving technology.

BACKGROUND ART

In an RRC connected state, a terminal checks received data through monitoring physical downlink control channel (PDCCH) for each subframe. If the PDCCH monitoring is continued even though no data is transmitted/received, battery consumption increases. In order to solve such a problem, a connected mode discontinuous reception (C-DRX) technology has been introduced.

The C-DRX technology is a technology repeating a cycle where the terminal switches a communication function to a sleep state when no data is transmitted/received and then wakes up after a certain period of time, instead of continuously activating the communication function in the RRC connected state. Since the PDCCH is not monitored in the sleep state (low power mode), the C-DRX technology is used as a battery saving technology for reducing battery consumption through a network technology.

However, on account of the C-DRX technology, a communication function may be in a sleep state where the communication function is deactivated, when immediate data transmission and reception is required. Then, there comes up a disadvantage in that a delay of a predetermined time (e.g., 10 ms to 20 ms) occurs up to data transmission and reception. For example, if 5G/LTE communication transitions to the sleep state by C-DRX technology when the user needs to immediately purchase an item during running a game on the terminal, the item cannot be purchased until the communication function is activated. Therefore, using continuously C-DRX technology may cause some issues in the 5G communication service providing various ultra-low-latency services.

DISCLOSURE

Technical Problem

The present invention provides a method for dynamically applying battery saving technology depending on an application.

The present invention provides a method for activating or deactivating a battery saving technology depending on a delay sensitivity of an application.

Technical Solution

According to an embodiment, a method for dynamically applying a battery saving technology by a terminal is provided. The method includes transmitting a first message requesting an activation of a battery saving technology dynamic service to an authentication server, receiving a second message being a response to the first message from the authentication server, transmitting and receiving data with a base station in a battery saving technology deactivated state, when response information included in the second message includes authentication success and at least one application included in the second message is running, and maintaining a battery saving technology activated state when the application included in the second message is not running.

The second message may include a list of applications to which the battery saving technology is not applied, and a first access point name (APN) used for accessing a network when an application included in the list of applications is executed.

Transmitting and receiving the data with the base station in the battery saving technology deactivated state may include accessing the base station with the first APN when an application included in the list of applications is executed in the battery saving technology activated state, receiving a request for releasing the battery saving technology from the base station, and switching the battery saving technology activated state to the battery saving technology deactivated state.

Maintaining the battery saving technology activated state may include releasing a bearer connected through the first APN when an execution of the application included in the list of applications is terminated, receiving a request for setup of the battery saving technology from the base station, and switching the battery saving technology deactivated state to the battery saving technology activated state.

The method for dynamically applying the battery saving technology may further include accessing the base station with a second APN different from the first APN when an application not included in the list of applications is executed in the battery saving technology activated state The application included in the second message may be a low-delay service application.

The method for dynamically applying the battery saving technology may further include transmitting a third message requesting periodically a status check of the battery saving technology dynamic service based on a status query time, to the authentication server, receiving a fourth message that is a response to the third message from the authentication server, and maintaining the battery saving technology dynamic service to be in an activated state when response information included in the fourth message includes an authentication success. Here, the second message may further include a state query time.

The method for dynamically applying the battery saving technology may further include transmitting a fifth message requesting a deactivation of the battery saving technology dynamic service to the authentication server, receiving a sixth message that is a response to the fifth message from the authentication server, and setting the battery saving technology dynamic service to a deactivated state when response information included in the sixth message includes a deactivation success.

According to another embodiment, a method for applying dynamically a battery saving technology by a terminal is provided. The method includes storing a list of connected mode discontinuous reception (C-DRX) unapplied applications which transmit and receive data in a C-DRX deactivated state (C-DRX Off), setting a C-DRX state to the C-DRX deactivated state (C-DRX Off) when at least one application included in the list of C-DRX unapplied applications is executed, and setting the C-DRX state to a C-DRX activated state (C-DRX On) when all applications included in the list of C-DRX unapplied applications are not executed.

The C-DRX unapplied application may be a low-delay service application, and the list of C-DRX unapplied applications may be received from an authentication server.

An application included in the list of C-DRX unapplied applications may access a base station with a first APN, and an application not included in the list of C-DRX unapplied applications may access a base station with a second APN.

The first APN may be received from the authentication server.

Setting the C-DRX state to the C-DRX deactivated state (C-DRX Off) may include accessing the base station with the first APN when a C-DRX unapplied application included in the list of C-DRX unapplied applications is executed, receiving a C-DRX release request from the base station, and switching the C-DRX state to the C-DRX deactivated state.

Setting the C-DRX state to the C-DRX activated state (C-DRX On) may include releasing a bearer connected through the first APN when the executed C-DRX unapplied application is terminated, receiving a C-DRX setup request from the base station, and switching the C-DRX deactivated state to the C-DRX activated state.

According to an embodiment, a method for dynamically applying a battery saving technology by an authentication server is provided. The method includes receiving a first message requesting an activation of a battery saving technology dynamic service from a terminal; and transmitting a second message that is a response to the first message to the terminal. The second message may include a list of applications to which the battery saving technology is not applied, and a first access point name (APN) used for a network access when an application included in the list of applications is executed. The first APN is an APN different from a second APN used for a network access when an application not included in the list of applications is executed.

The method for dynamically applying the battery saving technology may further include receiving a third message requesting periodically a status check of the battery saving technology dynamic service from the terminal, and transmitting a fourth message that is a response to the third message to the terminal. The terminal may maintain the battery saving technology dynamic service to be in an activated state when the fourth message includes an authentication success.

The method for dynamically applying the battery saving technology may further include receiving a fifth message requesting a deactivation of the battery saving technology dynamic service from the terminal, and transmitting a sixth message that is a response to the fifth message to the terminal. The terminal may set the battery saving technology dynamic service to a deactivated state when the sixth message includes a deactivation success.

A method for dynamically applying a battery saving technology by a base station is provided. The method includes receiving a request for accessing with a first APN from a terminal, transmitting a C-DRX setup request including C-DRX parameters to the terminal, and transmitting and receiving data with the terminal in a C-DRX activated state, receiving a request for accessing with a second APN from the terminal, and transmitting a C-DRX release request to the terminal, and transmitting and receiving data with the terminal in a C-DRX deactivated state.

The method for dynamically applying the battery saving technology may further include receiving a request for releasing a bearer connected through the second APN from the terminal, and transmitting a C-DRX setup request including C-DRX parameters to the terminal.

The second APN may be an APN allocated to a C-DRX unapplied application.

Advantageous Effects

According to the present invention, battery consumption can be reduced while providing an ultra-low-delay service, by activating or deactivating C-DRX depending on a delay sensitivity of an application.

MODE FOR INVENTION

Figure 1:
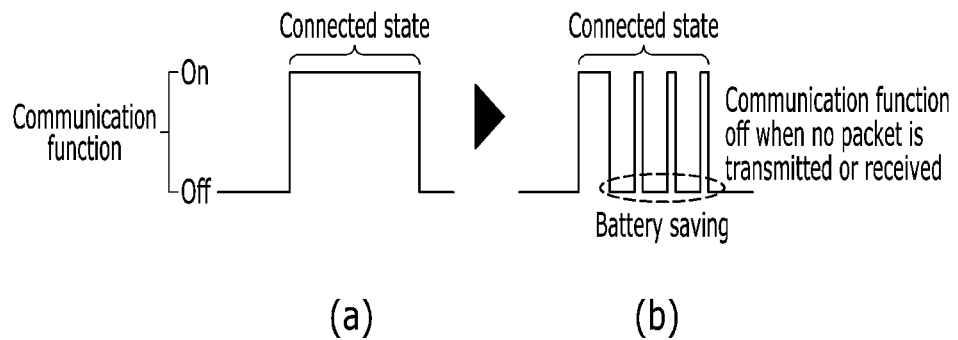
FIG. 1 is a diagram illustrating a connected mode discontinuous reception (C-DRX) technology.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, when a part is referred to "include" a certain constituent element, it means that it may further include other constituent elements rather than exclude other elements, unless specifically indicates otherwise. In the description, the terms such as " . . . unit", " . . . er/or", " . . . module", and the like refer to units that process at least one function or operation, which may be implemented with a hardware, a software or a combination thereof.

A terminal means a user terminal that communicates with a remote server via a 3G/long term evolution (LTE)/5G communication network. Hereinafter, it will be described that the terminal accesses the LTE/5G communication network. The terminal may be a mobility terminal of various types and purposes, such as a portable terminal, an IoT terminal, a vehicle terminal, a display terminal, a broadcasting terminal, and a game terminal.

The terminal accesses an access network/radio access network (RAN) via a communication network interface. In the description, it is assumed that the terminal accesses a base station (eNB/gNB) of the access network. A terminal that accessed the RAN is connected to a core network. Hereinafter, the core network will be described mainly with respect to apparatus/functions related to the present invention.

FIG. 1 is a diagram illustrating a connected mode discontinuous reception (C-DRX) technology.

Referring to (a) of FIG. 1, when the C-DRX technology is not applied, a communication function is continuously activated in an RRC connected state. Accordingly, battery consumption increases because the terminal checks received data through PDCCH monitoring.

Referring to (b) of FIG. 1, when the C-DRX technology is applied, the terminal repeats a cycle where the terminal switches a communication function to a sleep state when there is no transmitted/received data in the RRC connected state, wakes up after a certain period of time, and then monitors the PDCCH. Accordingly, since the terminal does not monitor the PDCCH in the sleep state (low power mode), battery consumption can be reduced.

Hereinafter, a method for dynamically applying a battery saving technology depending on an application will be described. In the description, a connected mode discontinuous reception (C-DRX) technology is referred to as a battery saving technology. However, the battery saving technology to which the present invention is applied is not required to be limited to C-DRX. The present invention may be used for a technology improved from the C-DRX or a technology of different types from the C-DRX.

In the description, a C-DRX dynamic service indicates a service that a C-DRX state of a terminal is dynamically activated (C-DRX On) or deactivated (C-DRX Off) depending on an executed application.

Figure 2:
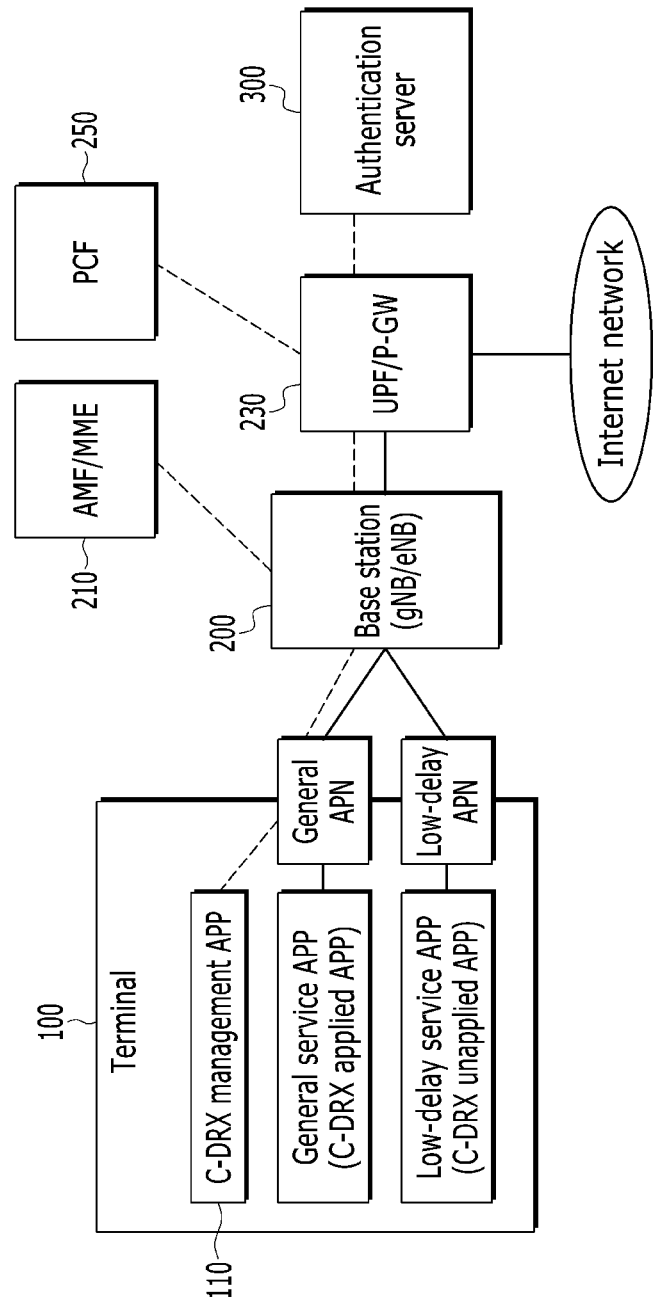
FIG. 2 is a diagram schematically illustrating a communication system according to an embodiment.

FIG. 2 is a diagram schematically illustrating a communication system according to an embodiment.

Referring to FIG. 2, a terminal 100 uses a communication service via network apparatuses. Specifically, a terminal 100 accesses a base station (gNB/eNB) 200 of an access network/radio access network (RAN). A core network includes an access and mobility management function (AMF)/mobility management entity (MME) 210, a user plane function (USF)/P-GW 230, a policy control function (PCF) (250), and an authentication server 300. The 5G core network further includes a session management function (SMF), a network exposure function (NEF), an application function (AF), and the like. A detailed description thereof will be omitted. For reference, in FIG. 2, the UPF is described as a network function of the 5G core network corresponding to the P-GW 230. However, in FIG. 7, SMF may be described as the network function of the 5G core network corresponding to the P-GW 230. The terminal 100 may support multiple access point names (APNs).

The terminal 100 is equipped with service applications (e.g., a video service application, a game service application, and the like) that provide various contents. Further, the terminal 100 is equipped with a management application (hereinafter, referred to as "C-DRX management application") 110 for dynamically applying a battery saving technology depending on an executed service application. Among service applications, an application that is designated to transmit and receive data in a C-DRX activated state (C-DRX On) is referred to as a general service application or C-DRX applied application, and an application that is designated to transmit and receive data in a C-DRX deactivated state (C-DRX Off) is referred to as a low-latency service application or a C-DRX unapplied application. The C-DRX management application 110 may be provided with various interworking interfaces required for executing an operation of the present invention.

When C-DRX management application 110 requests a C-DRX dynamic service activation, the terminal 100 transmits a C-DRX dynamic service activation request message to the authentication server 300, and receives a response message according to an authentication result. If the authentication is successful, the terminal 100 may use a C-DRX dynamic service that dynamically applies C-DRX depending on an application. Even after C-DRX dynamic service is successfully authenticated, the terminal 100 may periodically request an authentication status to the authentication server 300, and then receive an authentication status response. And, when a C-DRX dynamic service deactivation is requested in the C-DRX management application 110, the terminal 100 transmits a C-DRX dynamic service deactivation request message to the authentication server 300, and then may not use the C-DRX dynamic service.

First, when a general service application is executed in the terminal 100, the terminal 100 accesses the base station 200 with a general APN. Then, the base station 200 transmits a C-DRX setup request including C-DRX parameters to the terminal 100 accessed through the general APN, and the terminal 100 that received the C-DRX setup request transmits and receives data in the C-DRX activated state (C-DRX On).

When the low-delay service application is executed in the terminal 100, the terminal 100 accesses the base station 200 with an APN (hereinafter, referred to as "low-delay APN") assigned to the low-delay service application. Then, the base station 200 transmits a C-DRX release request to the terminal 100 accessing with the low-delay APN, and the terminal 100 receiving the C-DRX release request immediately transitions to the C-DRX deactivated state (C-DRX Off). As a result, the low-delay service application can transmit and receive data in the C-DRX deactivated state (C-DRX Off). Thereafter, when the executed low-delay service application is terminated, the terminal 100 releases a bearer connected to the low-delay APN. Then, the base station 200 transmits a C-DRX setup request including C-DRX parameters to the terminal 100, and the terminal 100 transitions to the C-DRX activated state (C-DRX On).

As described above, the terminal 100 accesses the base station 200 with an APN classified depending on an application. The base station 200 transmits a C-DRX setup request or a C-DRX release request to the terminal 100 based on the APN with which the terminal 100 accessed. For this, the terminal 100 manages a low-delay service application list and a low-delay APN. The low-delay service application list and the low-delay APN may be received from the authentication server (300). The authentication server 300 can transmit a response to the C-DRX dynamic service activation request including the low-delay service application list and the low-delay APN. The low-latency service application list can be transmitted in detail with JSON being a RESTful of HTTP.

Meanwhile, without interworking with the authentication server 300, the terminal 100 can manage the low-latency service application list and the low-latency APN, and provide the C-DRX dynamic service while switching between the C-DRX activated state (C-DRX On) and C-DRX deactivated state (C-DRX Off) depending on the executed application. Here, the C-DRX dynamic service based on interworking between the terminal 100 and the authentication server 300 is mainly described, but the C-DRX dynamic service may be provided without interworking between the terminal 100 and the authentication server 300.

The C-DRX management application 110 of the terminal 100 and the authentication server 300 may interwork using a designated interworking protocol (e.g., HTTPS) and a designated TCP port (e.g., 8887). A data format may be, for example, JSON. A POST method of HTTP request is used as the interworking method, and HTTP URI may be used. Interworking data is composed of a HTTP Header and a HTTP Content area, and the header and the content can be divided by a line break (carriage return/line feed, CRLF). The properties of the content area may be represented through a content-type field included in the HTTP header. A length of the content object can be defined through a content-length field including CRLF, and continuous CRLF characters can be inserted at the end of content data.

The C-DRX management application 110 of the terminal 100 may transmit an HTTP Request packet, for example, including information in Table 1 to the authentication server 300.

TABLE 1

| HTTP Request | Description |
| --- | --- |
| Request Method: POST | RequestExpression of Request Method: POST |
| URI: [value] | Request URI: Expression of an URI to |
| Request Version: HTTP/1.1 | be accessed |
| Accept-Language: ko-KR | Request Version: HTTP/1.1 support |
| Content-Type: [value]; | Accept-Language: Korean language support |
| charset-"utf-8" | Content-Type: Definition of contents type |
| Content-Length: [value] | (Korean UTF-8 format support) |
| | Content-Length: Definition of size of contents |

The authentication server 300 may transmit an HTTP response packet, for example, including information in Table 2 to the C-DRX management application 110 of the terminal 100.

TABLE 2

| HTTP Response | Description |
| --- | --- |
| Request Version: HTTP/1.1 | Request Version: HTTP/1.1 support |
| Status Code: 200 OK | Status Code: HTTP Status code |
| Accept-Language: ko-KR | Accept-Language: Korean language support |
| Content-Type: [value]; | Content-Type: Definition of contents type |
| charset = "utf-8" | (Korean UTF-8 format support) |
| Content-Length: [value] | Content-Length: Definition of size of contents |

Hereinafter, a method that the C-DRX management application 110 of the terminal 100 activates or deactivates the C-DRX dynamic service, by interworking with the authentication server 300, and periodically checks authentication status in the C-DRX dynamic service activated state will be described. In the description, the terminal 100 or the C-DRX management application 110 will be interchangeably described as an entity performing operations.

Figure 3:
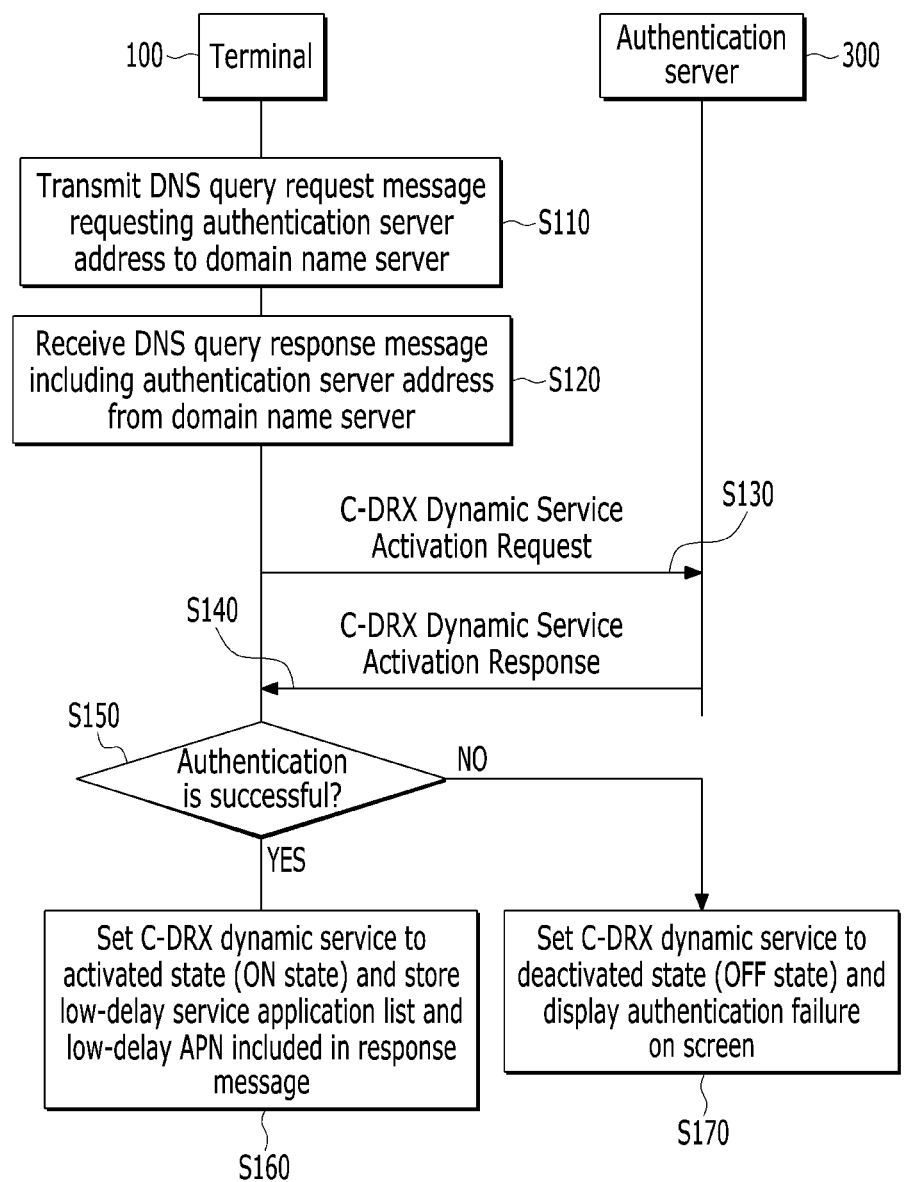
FIG. 3 is a flowchart illustrating a method for activating a C-DRX dynamic service according to an embodiment.

FIG. 3 is a flowchart illustrating a method for activating a C-DRX dynamic service according to an embodiment. Referring to FIG. 3, when a C-DRX dynamic service activation request (C-DRX dynamic service ON setup) is input in a C-DRX management application 110, the terminal 100 transmits a DNS query request message requesting an authentication server address to a domain name server (not shown) (S110).

The terminal 100 receives a DNS query response message including the authentication server address from the domain name server (S120). The DNS query response message may include a plurality of authentication server addresses, for example, an IPv4 address or an IPv6 address.

The terminal 100 transmits a C-DRX dynamic service activation request message to the address of the authentication server 300 included in the DNS query response message (S130). When a plurality of authentication server addresses is included in the DNS query response message, the terminal 100 may select one authentication server address. The terminal 100 may transmit an activation request message written in JSON format of HTTPS to the authentication server 300. The terminal 100 connects to the authentication server 300 via a designated TCP connection port.

The authentication server 300 generates response information based on subscriber information of the terminal 100 and service availability status, and transmits a response message (C-DRX dynamic service activation response), including the response information, to the terminal 100 (S140). The response information includes an authentication result. The authentication result may include a value selected from response codes. If the authentication is successful, the response information may include a low-delay service application list, a low-latency APN assigned to a low-delay service application. The low-delay service application list may include at least one low-delay service application.

The terminal 100 determines whether the authentication result included in the response message is a success (S150).

If the authentication result included in the response message is a success, the terminal 100 sets a C-DRX dynamic service to an activated state (ON state), and stores the low-delay service application list and the low-delay APN included in the response message (S160). And, when the low-delay service application is executed, the terminal 100 may access a base station 200 with the low-delay APN. Then, upon receiving a C-DRX release request, the terminal 100 can switch to a C-DRX deactivated state (C-DRX Off).

If the authentication result included in the response message is a failure, the terminal 100 may set the C-DRX dynamic service to a deactivated state (OFF state) and notify the authentication failure by displaying the failure on a screen (S170). The terminal 100 may check a response code of the response message, and display a notification message corresponding to the response code, with a UI toast.

Variables included in the C-DRX dynamic service activation request message may be defined as shown in Table 3, and a message format may be as shown in Table 4. The C-DRX dynamic service activation request message may further include a request URL. In Table 4, "/" may mean a line breaker (CRLF).

TABLE 3

| Request variable | Value (Min/Max) | Description |
| --- | --- | --- |
| UEVersion: ProtocolVersion | String(1/1) | Protocol version name (default: "2") |
| UEVersion: Model | String(8/32) | Terminal model name (Example: AB-G960N) |
| UEVersion: Binary | String(8/32) | Binary version name (Example: A950NKOU3CRD5) |
| Username: IMSI | String(15) | USIM IMSI value (Example: 450086000001023) |
| Username: MSISDN | String(12) | MSISDN value |
| Username: 5GLTEIP | String(7/15) | 5G/LTE IP (Example: 10.1.1.1) WiFi (Example: 127.0.0.1) |

TABLE 3-continued

| Request variable | Value (Min/Max) | Description |
|---|---|---|
| Username: ServicePackageName | String(8/64) | Package name of C-DRX management application (Example: com.kt.cdrx) |
| Password | String (Variable) | Username password value (Random) |

TABLE 4

```
POST /cdrx/ServiceActivationRequest HTTP/1.1//
Accept-Language: ko-KR//
Channel-Auth-Token: 1234567890123456//
Content-Type: application/json;charset="utf-8"//
Content-Length:150//
//
{
    "UEVersion": {
        "ProtocolVersion": "2",
        "Model": "AB-G960N",
        "Binary": "A950NKOU3CRD5"
    }
    "Username": {
        "IMSI": "450086000001023",
        "MSISDN": "01012345678",
        "5GLTEIP": "10.1.1.1",
        "ServicePackageName": "com.kt.cdrx"
    }
        "Password": "1234567890"
}
//
```

Variables included in the C-DRX dynamic service activation response message may be defined as shown in Table 5. The response code may include a code corresponding to an authentication success or authentication failure, among the response variables. When the authentication is unsuccessful, the code may be assigned according to a reason of the failure. The response code may be defined as shown in Table 6. When the authentication result is a failure, the terminal 100 may display a notification message corresponding to the response code, with a UI toast.

TABLE 5

| Response variable | Value (Min/Max) | Description |
|---|---|---|
| Code | String(3/3) | Response code (Example: "200") |
| Message | String(8/255) | User notification message (Example: Authentication is completed) |
| Username: MSISDN | String(8) | Terminal MSISDN value requested to server (Example: 821012345678) |
| Username: Access Token | String(8/32) | Access Token value of authenticated terminal (Example: 1234093493503053) |
| Username: App: APNName | String(8/32) | APN of low-latency service application (Example: abc.5g.com) |
| Username: App: PackageName | String(8/64) | Package name of low-latency service application (Example: com.kt.game1) |
| Username: App: PublicKey | String(1024) | Public key of each low-latency service application (Use blank padding when public key is less than 1024) |
| Username: App: InstallerName | String(8/64) | Installer name of low-latency service application (Example: Google Play Store, etc.) |
| Username: App: PcoAuthType | String(3/4) | Authentication type to be used when connecting to 5G/LTE APN (Example: "PAP" or "CHAP") |
| Username: App:PcoID | String(8/32) | PCO ID to be used when connecting to 5G/LTE APN (Example: cdrxid) |
| Username: App: PcoPassword | String(8/32) | PCO Password to be used when connecting to 5G/LTE APN (Example: cdrxpassword) |
| Username: StatusQueryTime | String(6/6) | Status check time |
| Usename: StatusServerURL | String(7/15) | Server URL whose status is to be checked (When connected, HTTPS is operated) (Example: cdrx.kt.com) |
| Password | String (Variable) | Username password value (Random) |

TABLE 6

| Response code | Notification |
|---|---|
| 200 | Success |
| 401 | Failure (Content-Type error) |
| 402 | Failure (HTTP method error) |
| 403 | Failure (Channel-Auth-Token omission error) |
| 404 | Failure (JSON body decryption failure) |
| 405 | Failure (Username decryption failure) |
| 406 | Failure (MSISDN format error) |
| 408 | Failure (incorrect ServicePackageName) |
| 414 | Failure (Not subscriber) |
| 415 | Failure (Not serviceable model) |
| 416 | Failure (Not serviceable IMSI) |
| 900 | Failure (Completely terminate service) |

A format of the C-DRX dynamic service activation response message may be as shown in Table 7.

TABLE 7

```
HTTP/1.1 200OK//
Accept-Language: ko-KR//
Channel-Auth-Token: 0987654321654321//
Content-Type: application/json;charset="utf-8"//
Content-Length:250//
//
{
    "Code": 200,
    "Message": "Authentication is completed.",
    "Username": {
        "MSISDN": "01012345678"
        "AccessToken": "adbdegitkgklhtl",
        "App": [
            {
                "APNName": "abc.private.5g.com",
```

TABLE 7-continued

```
            "PackageName": "com.kt.game1",
            "PublicKey":"MIIBIjANBgkqhkiG9w0BAQEFAAOCAQ8AMIIBCgKC
AQEAmf2vPw1jWtRxB3CwFmgFUqybrO+RKz23jNl2jq5xdBXFPG6e
ZKFv/ND6GWO8khyCsbqKjwYwTAWb1hc5k10rYPqwUl3lWGo5Qdf
11VfCSfpoAuOtiGi0i/mhL3F8YyXAlJGPBlPz4olblTn1g1Dk67+A5ZcE
qog8PeaV6iysOhStvXuMadhIgAK08haQnRBMJeSV26hoGRExl1NAax
F6Cy7Xlz+4LxEvAH/u/P4CPzFaCSpStluM37526zcNN//auHOnQ8BZv
NEGU8jjKzlt/4Q4OnJdqlhz6V8aXNOVSVWuBC/10SZe9tNftql5wGM
FkoC101eXg+8yi7KQ9gOUhwIDAQAB",
            "InstallerName":
["com.sec.android.app.samsungapps","com.android. vending"],
            "PcoAuthType": "",
            "PcoID": "ktgame"
            "PcoPassword": "",
        }
        {
            "APNName": "abc.private.5g.com",
            "PackageName": "com.kt.game1",
            "PublicKey": "MIIBITANBgkqhkiG9w0BAQEFAAOCAQ4AMIIBCQK
CAQB1We6VQRNZzBk5xJNrHFlHxir3teWWmFVSxR3u0dVIP42KLP
9lzzCvvm7HwiPN9GPUf68m2fZWOugLbs0vRMNBD2st5KtDNFkNtD
BLyq+p3eA7270Gob7cEuCGNvcF04gayURgDpKv+Fi2xLMvP6UMefb
cYMnq4Dnw5RsyQ6jp9MGn+eldeNGWd6RUlsuz1ukYsVKICeMeecB
gSF1kf8kpgGPnfRVLHBs1kjI57FPV3Qy/FrEYZM/xpE8PQK09TdJs2Z
EKntBBSulvvQG5JXQ+u5vaDRMJcRS2iTVqyFzRsc2lKwC2vBGcgibt
AX/VXlF9zGTVbA/48+ukPP64LOb/AgMBAAE=",
            "InstallerName":
["com.sec.android.app.samsungapps","com.android. vending"],
            "PcoAuthType": "",
            "PcoID": "",
            "coPassword": ""
        }
    ]
    "StatusQuery Time": ["""""""]
    "StatusServerURL": "cdrx.kt.com"
}
"Password": "0987654321"
}
//
```

Referring to Table 7, when the response code is 200 meaning an authentication success, the terminal 100 can access a communication network with a low-latency APN of "APNName=abc.private.5g.com", and transmit a traffic of a low-latency service application with "PackageName=com.kt.game1". When connecting to a 5G/LTE network, if a UPF/P-GW requests a delivery of PCO ID/PW, the terminal 100 may use an authentication type of "PcoAuthType=PAP" included in the HTTP response message as shown in Table 7, and may transmit a PDN connectivity request including a PCO value of "PcoID" and "PcoPassword" to the UPF/P-GW. Here, the terminal 100 may mistransmit the PCO value or may receive the PDN connectivity response including PDN reject from the 5G/LTE UPF/PGW for other reasons. Then, the terminal 200 may attempt to reconnect with the PDN. When the PDN connection is finally unsuccessful, the terminal may not attempt to connect through a low-latency APN, but may transmit and receive the traffic of the low-latency service application through a bearer of a general APN.

If "UEVersion: ProtocolVersion" is "1", and "InstallerName" of an application included in the response message includes information on two or more stores (Google Play Store, Galaxy Apps, One Store, and the like), the terminal 100 should check whether the corresponding application is installed from the stores included in the "InstallerName". When the installed application is not installed through "InstallerName" included in the response message, the terminal 100 may provide a service of the application included in the response message via a bearer of the general APN.

When "UEVersion: ProtocolVersion" is "2", the terminal 100 determines whether a PublicKey of the corresponding application is normal through "PublicKey" of the application included in the response message. If the PublicKey of the installed application is different from the PublicKey included in the response message, the terminal 100 may provide the service of the application included in the response message through a bearer of the general APN.

Figure 4:
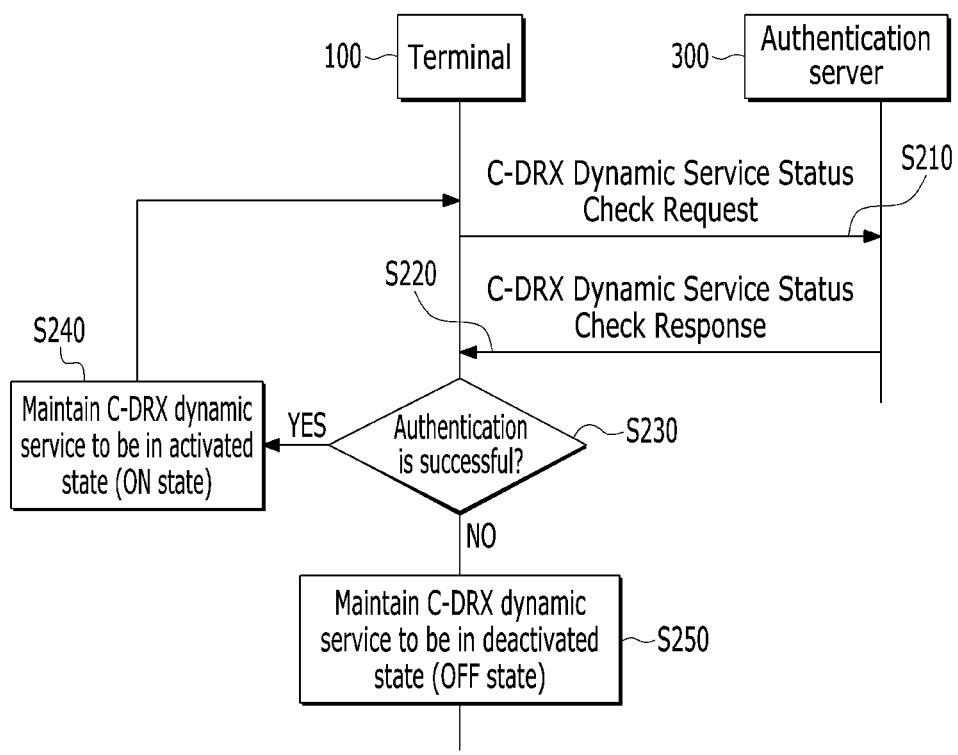
FIG. 4 is a flowchart illustrating a method for checking a C-DRX dynamic service status according to an embodiment.

FIG. 4 is a flowchart illustrating a method for checking a C-DRX dynamic service status according to an embodiment.

Referring to FIG. 4, after a C-DRX dynamic service is set to an activated state (ON state), a terminal 100 periodically transmits a C-DRX dynamic service status check request message to an authentication server 300 (S210). The terminal 100 may periodically transmit a status check request message based on a status query time (StatusQueryTime) included in a C-DRX dynamic service activation response message. The terminal 100 may transmit the status check request message to a server address (StatusServerURL) included in the C-DRX dynamic service activation response message. The server address may be the same as or different from an address of the authentication server 300 included in a DNS query response message.

After the C-DRX dynamic service is activated, the terminal 100 continuously checks whether the C-DRX dynamic service is maintained to be in an activated state (authenticated state). As a result, a user can recognize that C-DRX dynamic service is continuously maintained.

The authentication server 300 transmits a C-DRX dynamic service status check response message including status information, to the terminal 100 (S220).

The terminal 100 checks whether an authentication result included in the C-DRX dynamic service status response message is a success (S230).

When the authentication result includes an authentication success, the terminal 100 maintains the C-DRX dynamic service to be in an activated state (ON state) (S240). The terminal 100 waits for a next status query time, and repeats step S210 when it comes the next status query time.

If the authentication result includes an authentication failure, the terminal 100 switches the C-DRX dynamic service to a deactivated state (OFF state) (S250). The terminal 100 may display a notification of the authentication result.

Through such a message exchange, the authentication server 300 manages the authentication status of the terminal 100. The terminal 100 may exchange messages with the authentication server 300 via a 5G/LTE/3G/WiFi network.

Variables included in the C-DRX dynamic service status check request message may be defined as shown in Table 8, and a message format may be as shown in Table 9. The C-DRX dynamic service status check request message may further include a request URL.

TABLE 8

| Request variable | Value (Min/Max) | Description |
|---|---|---|
| UEVersion: ProtocolVersion | String(1/1) | Protocol version name (Default value: "1") |
| UEVersion: Model | String(8/32) | Terminal model name (Example: AB-G960N) |
| UEVersion: Binary | String(8/32) | Binary version name (Example: A950NKOU3CRD5) |
| Username: MSISDN | String(12) | MSISDN value |
| Username: AccessToken | String(8/32) | Access Token value of authenticated terminal included in C-DRX dynamic service activation response message (Example: 1234093493503053) |
| Username: ServicePackageName | String(8/64) | Package name of C-DRX management application (Example: com.kt.cdrx) |
| Username: App: PackageName | String(8/64) | Package name of each low-latency service application (Example: com.kt.game1) |
| Password | String (Variable) | Username password value (Random) |

TABLE 9

POST /cdrx/StatusCheckRequest HTTP/1.1//
Accept-Language: ko-KR//
Channel-Auth-Token: 1234567890123456//
Content-Type: application/json;charset="utf-8"//
Content-Length: 150 //
//
{
　"UEVersion": {
　　"ProtocolVersion": "1",
　　"Model": "AB-G960N",
　　"Binary": "A950NKOU3CRD5"
　}
　"Username": {
　　"MSISDN": "",
　　"AccessToken": "adbdegitkgklhtl",
　　"ServicePackageName": "com.kt.cdrx"
　　"App": [
　　　{
　　　　"PackageName": "com.kt.game1",
　　　}
　　　{
　　　　"PackageName": "com.kt.game2",
　　　}
　　]
　}

TABLE 9-continued

"Password": "1234567890"
}
//

Variables included in the C-DRX dynamic service status check response message may be defined as shown in Table 10. A response code among response variables includes a code corresponding to an authentication success or authentication failure. When the authentication is unsuccessful, a code may be assigned depending on a reason of the failure. The response code may be defined as shown in Table 11. If the authentication result is a failure, the terminal 100 may not display an additional notification message corresponding to the response code.

TABLE 10

| Response variable | Value (Min/Max) | Description |
|---|---|---|
| Code | String(3/3) | Response code (Example: "200") |
| Message | String(8/255) | User notification message (Example: Authentication is completed, or You are not subscribed to C-DRX dynamic service) |
| Username: MSISDN | String(12) | Terminal MSISDN value requested to server (Example: 821012345678) |
| Username: AccessToken | String(8/32) | Access Token value of authenticated terminal (Example: 1234093493503053) |
| Username: App: APNName | String(8/32) | APN of low-latency service application (Example: abc.5g.com) |
| Username: App: PackageName | String(8/64) | Package name of low-latency service application (Example: com.kt.game1) |
| Username: App: PublicKey | String(1024) | Public Key for each low-latency service application (use blank padding when Public Key is less than 1024) |
| Username: StatusQueryTime | String(6/6) | Status check time |
| Usename: StatusServerURL | String(7/15) | URL of server whose status is to be checked (when connected, HTTPS is operated) (Example: cdrx.kt.com) |
| Password | String (Variable) | Username password value (Random) |

TABLE 11

| Response code | Notification |
|---|---|
| 200 | Success 성공 |
| 401 | Failure (Content-Type error) |
| 402 | Failure (HTTP method error) |
| 403 | Failure (Channel-Auth-Token omission error) |
| 404 | Failure (JSON body decryption failure) |
| 405 | Failure (Username decryption failure) |
| 406 | Failure (MSISDN format error) |
| 407 | Failure (incorrect accessToken) |
| 408 | Failure (incorrect ServicePackageName) |
| 409 | Failure (incorrect AppPackageName) |
| 410 | Failure (incorrect UsedData period. If period, for which usage volume information has already been received, is retransmitted) |
| 411 | Failure (UsedData format error) |
| 412 | Failure (UsedDataFrom format error) |
| 413 | Failure (UsedDataTo format error) |
| 900 | Failure (Completely terminate service) |

A format of the C-DRX dynamic service status response message may be as shown in Table 12.

TABLE 12

```
HTTP/1.1 200OK //
Accept-Language: ko-KR //
Channel-Auth-Token: 0987654321654321 //
Content-Type: application/json;charset="utf-8" //
Content-Length:250 //
//
{
    "Code": 200,
    "Message": "Authentication is completed.",
    "Username": {
        "MSISDN": "01012345678"
        "AccessToken": "adbdegitkgklhtl",
        "App": [
            {
                "APNName": "abc.private.5g.com",
                "PackageName": "com.kt.game1",
                "PublicKey": "MIIBIjANBgkqhkiG9w0BAQEFAAOCAQ8AMIIB
                CgKCAQEAmf2vPw1jWtRxB3CwFmgFUqybrO+RKz23jNl2jq5x
                dBXFPG6eZKFv/ND6GWO8khyCsbqKjwYwTAWb1hc5k10rYP
                qwUl3lWGo5Qdf11VfCSfpoAuOtiGi0i/mhL3F8YyXAlJGPBlPz4
                olblTn1g1Dk67+A5ZcEqog8PeaV6iysOhStvXuMadhIgAK08haQ
                nRBMJeSV26hoGRExl1NAaxF6Cy7Xlz+4LxEvAH/u/P4CPzFaC
                SpStluM37526zcNN//auHOnQ8BZvNEGU8jjKlt/4Q4OnJdqlhz6V
                8aXNOVSVWuBC/10SZe9tNftql5wGMFkoC101eXg+8yi7KQ9g
                OUhwIDAQAB"
            }
            {
                "APNName": "abc.private.5g.com",
                "PackageName": "com.kt.game2",
                "PublicKey":"MIIBITANBgkqhkiG9w0BAQEFAAOCAQ4AMII
                BCQKCAQB1We6VQRNZzBk5xJNrHFlHxir3teWWmFVSxR3u
                0dVIP42KLP9lzzCvvm7HwiPN9GPUf68m2fZWOugLbs0vRMN
                BD2st5KtDNFkNtDBLyq+p3eA7270Gob7cEuCGNvcF04gayURg
                DpKv+Fi2xLMvP6UMefbcYMnq4Dnw5RsyQ6jp9MGn+e1deNG
                Wd6RUlsuz1ukYsVKICeMeecBgSF1kf8kpgGPnfRVLHBs1kjI57
                FPV3Qy/FrEYZM/xpE8PQK09TdJs2ZEKntBBSulvvQG5JXQ+u5
                vaDRMJcRS2iTVqyFzRsc2lKwC2vBGcgjbtAX/VXlF9zGTVbA/4
                8+ukPP64LOb/AgMBAAE="
            }
        ]
        "StatusQueryTime": [""""""]
        "StatusServerURL": "cdrx.kt.com"
    }
    "Password": "0987654321"
}
//
```

Figure 5:
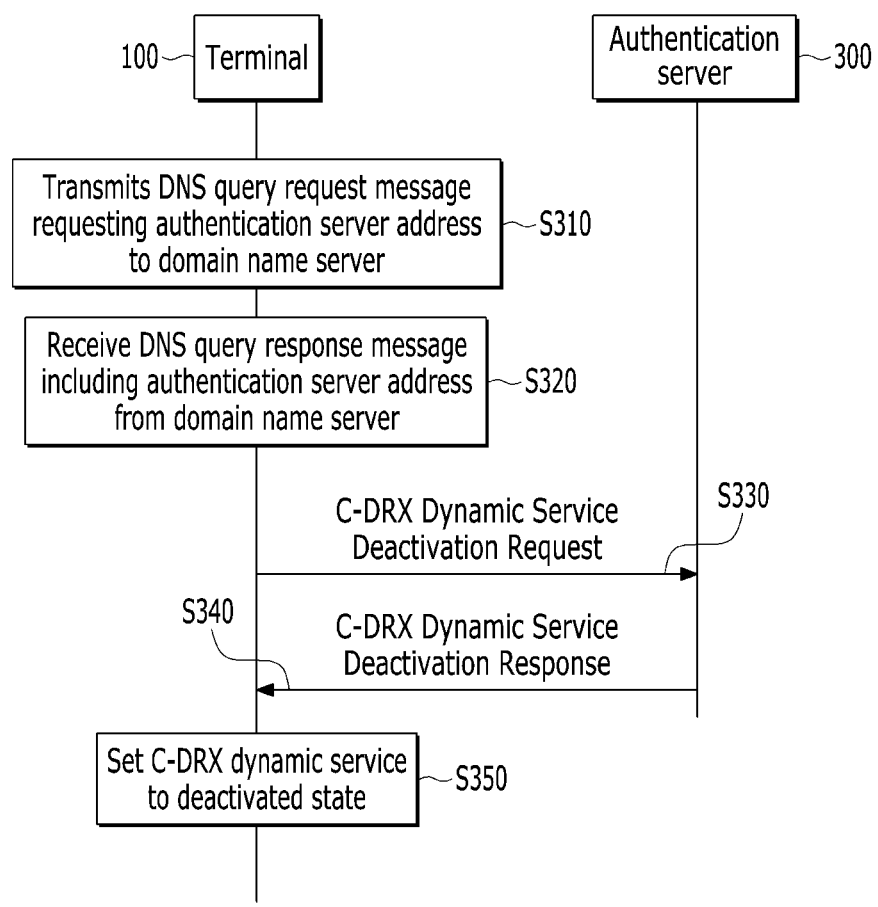
FIG. 5 is a flowchart illustrating a method for deactivating a C-DRX dynamic service according to an embodiment.

FIG. 5 is a flowchart illustrating a method for deactivating a C-DRX dynamic service according to an embodiment. Referring to FIG. 5, when a C-DRX dynamic service deactivation request (C-DRX dynamic service OFF setup) is input in a C-DRX management application 100, a terminal 100 transmits a DNS query request message requesting an authentication server address, to a domain name server (not shown) (S310).

The terminal 100 receives a DNS query response message including the authentication server address from the domain name server (S320). The DNS query response message may include a plurality of authentication server addresses, for example, an IPv4 address or an IPv6 address.

The terminal 100 transmits a C-DRX dynamic service deactivation request message to the address of the authentication server 300 included in the DNS query response message (S330).

The authentication server 300 switches a C-DRX dynamic service state of the terminal 100 to an deactivated state, and transmits a C-DRX dynamic service deactivation response message to the terminal 100 (S340).

The terminal 100 sets the C-DRX dynamic service to the deactivated state (S350).

Variables included in the C-DRX dynamic service deactivation request message may be defined as shown in Table 8, and a message format may be as shown in Table 13.

TABLE 13

```
POST /game/ServiceDeactivationRequest HTTP/1.1 //
Accept-Language: ko-KR //
Channel-Auth-Token: 1234567890123456 //
Content-Type: application/json;charset="utf-8" //
Content-Length: 150 //
//
{
    "UEVersion": {
        "ProtocolVersion": "1",
        "Model": "AB-G960N",
        "Binary": "A950NKOU3CRD5"
    }
    "Username": {
        "MSISDN": ""
        "AccessToken": "adbdegitkgklhtl",
        "ServicePackageName": "com.kt.cdrx"
        "App": [
            {
                "PackageName": "com.kt.game1",
            }
            {
```

TABLE 13-continued

```
            "PackageName": "com.kt.game2",
         }
      ]
   }
   "Password": "1234567890"
}
//
```

The terminal 100 operates according to the C-DRX dynamic service deactivation response message received from the authentication server 300. C-DRX dynamic service deactivation response message may include a response code corresponding to a deactivation success. Variables included in the C-DRX dynamic service deactivation response message may be defined as shown in Table 14, and a message format may be as shown in Table 15. A response code among the response variables may be defined as shown in Table 16. If the authentication result is a failure, the terminal 100 may not display an additional notification message corresponding to the response code.

TABLE 14

| Response variable | Value (Min/Max) | Description |
| --- | --- | --- |
| Code | String(3/3) | Response code (Example: "200") |
| Message | String(8/255) | User notification message (Example: Setup Off is completed.) |
| Password | String(Variable) | Username password value (Random) |

TABLE 15

```
HTTP/1.1 200OK //
Accept-Language: ko-KR //
Channel-Auth-Token: 0987654321654321 //
Content-Type: application/json;charset-"utf-8" //
Content-Length:250 //
//
{
    "Code": 200,
    "Message": "Setup Off is completed."
}
//
```

TABLE 16

| Response code | Notification |
| --- | --- |
| 200 | Success |
| 401 | Failure (Content-Type Error) |
| 402 | Failure (HTTP Method Error) |
| 403 | Failure (Channel-Auth-Token Omission Error) |
| 404 | Failure (JSON body decryption failure) |
| 405 | Failure (Username decryption Failure) |
| 406 | Failure (MSISDN format error) |
| 407 | Failure (Incorrect accessToken) |
| 408 | Failure (Incorrect ServicePackageName) |
| 409 | Failure (Incorrect AppPackageName) |
| 900 | Failure (Completely terminate service) |

Figure 6:
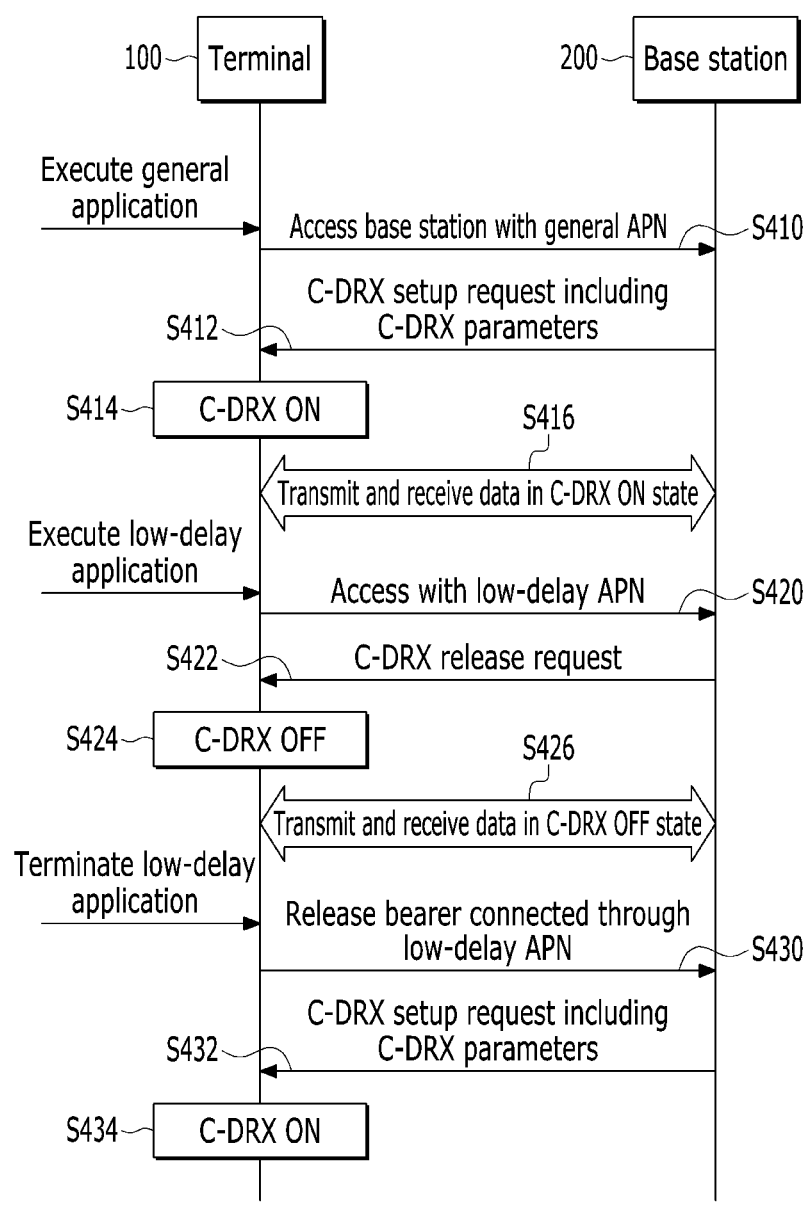
FIG. 6 is a flowchart showing a method for activating/deactivating C-DRX for a C-DRX dynamic service according to an embodiment.

FIG. 6 is a flowchart showing a method for activating/deactivating C-DRX for a C-DRX dynamic service according to an embodiment. Referring to FIG. 6, when a general service application is executed, a terminal 100 accesses a base station 200 with a general APN (S410).

The base station 200 transmits a C-DRX setup request including C-DRX parameters to the terminal 100 accessed with the general APN (S412). The base station 200 may transmit RRC Connection Reconfiguration including the C-DRX parameters.

The terminal 100 sets a C-DRX activated state (C-DRX On) (S414).

The terminal 100 transmits and receives data of a general service application in a C-DRX activated state (C-DRX On) (S416). Since being in the C-DRX activated state (C-DRX On), the terminal 100 can reduce battery consumption.

When a low-delay service application is executed in a C-DRX dynamic service activated state (C-DRX dynamic service ON), the terminal 100 accesses the base station 200 with a low-delay APN (S420).

The base station 200 transmits a C-DRX release request to the terminal 100 accessed with the low-delay APN (S422). The base station 200 may transmit the RRC Connection Reconfiguration including the C-DRX release request.

The terminal 100 switches from the C-DRX activated state (C-DRX On) to the C-DRX deactivated state (C-DRX Off) (S424).

The terminal 100 transmits and receives data of the low-delay service application in the C-DRX deactivated state (C-DRX off) (S426).

When the executed low-delay service application is terminated, the terminal 100 releases a bearer connected through the low-delay APN (S430).

The base station 200 transmits a C-DRX setup request including C-DRX parameters to the terminal 100 (S432). The base station 200 may transmit RRC Connection Reconfiguration including the C-DRX parameters.

The terminal 100 switches from the C-DRX deactivated state (C-DRX Off) to the C-DRX activated state (C-DRX On) (S434).

Figure 7:
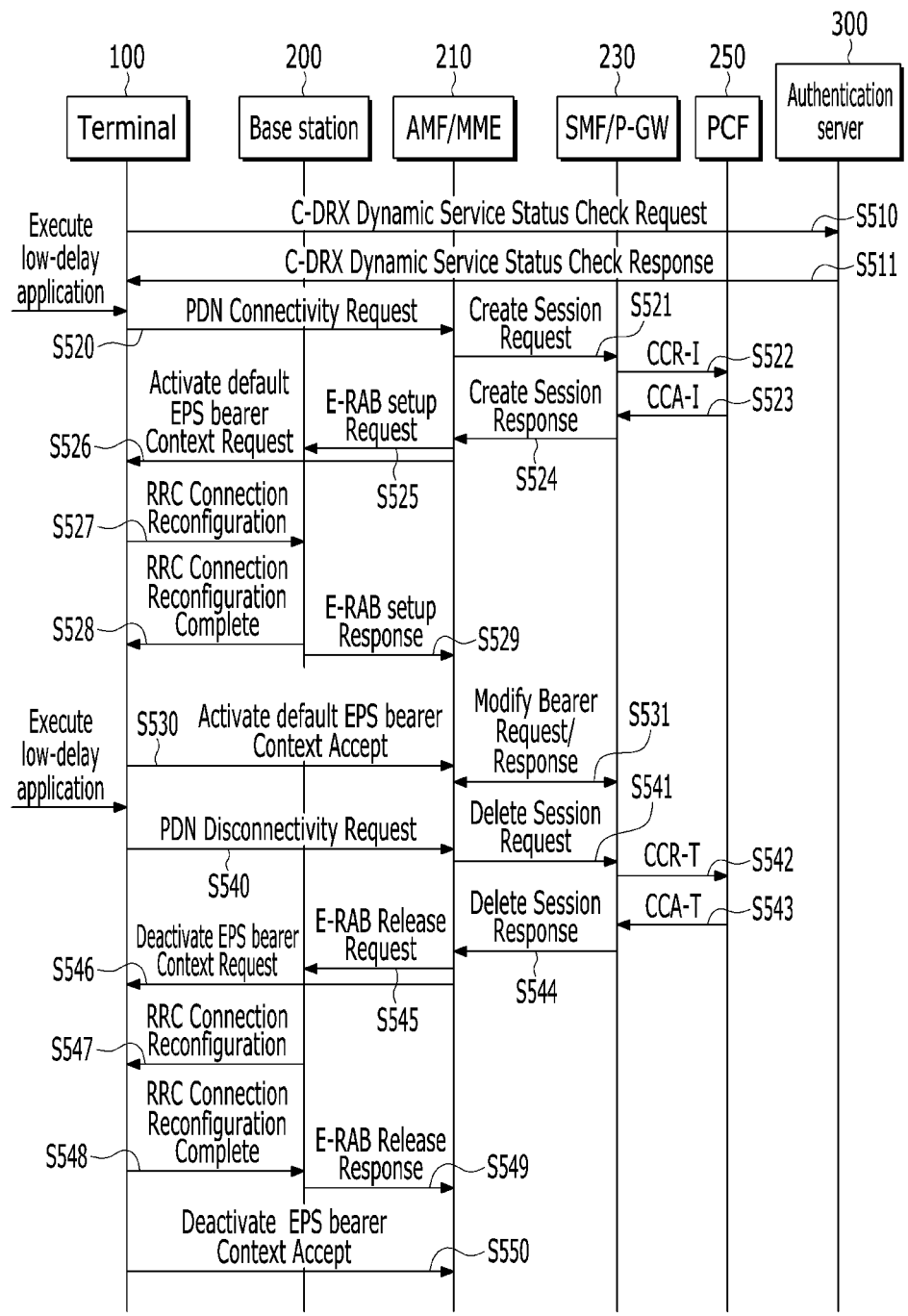
FIG. 7 is a flowchart of a C-DRX dynamic service method according to an embodiment.

FIG. 7 is a flowchart of a C-DRX dynamic service method according to an embodiment.

Referring to FIG. 7, a terminal 100 transmits a C-DRX dynamic service activation request message to an authentication server 300 (S510). When a C-DRX dynamic service activation request (C-DRX dynamic service ON setup) is input in a C-DRX management application 110, the terminal 100 starts to exchange messages with the authentication server 300 for the C-DRX dynamic service activation.

The authentication server 300 transmits a response message (C-DRX dynamic service activation response) including response information, to the terminal 100 (S511). The response information includes an authentication result. If the authentication is successful, the response information may include a low-delay service application list and a low-delay APN assigned to the low-delay service application. If the authentication result is success, it becomes a C-DRX dynamic service activated state (C-DRX dynamic service ON state) in which C-DRX can get dynamically ON/OFF.

When the low-delay service application is executed in the C-DRX dynamic service activated state, the terminal 100 accesses a base station 200 with a low-delay APN, and transmits a PDN Connectivity Request (S520). The PDN Connectivity Request is transmitted to an AMF/MME 210. The PDN Connectivity Request may include "PcoID" and "PcoPassword" required by a SMF/P-GW 230. "PcoID" and "PcoPassword" may be included in a C-DRX Dynamic Service Activation Response message.

The MME 210 transmits a Create Session Request to the SMF/P-GW 230 (S521).

The SMF/P-GW 230 transmits an authentication request (Credit Control Request, CCR-I) for creating a session, to the PCF 250 (S522), and receives an authentication response (Credit Control Answer, CCA-I) from the PCF 250 (S523). The PCF 250 may transmit an authentication response including quality information (e.g., QCI=9).

The SMF/P-GW 230 transmits a Create Session Response to the MME 210 (S524).

The AMF/MME 210 transmits an E-RAB setup Request to the base station 200 (S525).

The AMF/MME 210 transmits an Activate default EPS bearer Context Request to the terminal 100 (S526).

The base station 200 transmits an RRC Connection Reconfiguration including a C-DRX release request to the terminal 100 (S527).

The terminal 100 deactivates C-DRX (C-DRX OFF) and transmits an RRC Connection Reconfiguration Complete to the base station 200 (S528).

The base station 200 transmits an E-RAB setup Response to the AMF/MME 210 (S529).

The terminal 100 transmits Activate default EPS bearer Context Accept to the AMF/MME 210 (S530).

The AMF/MME 210 and the SMF/P-GW 230 transmit a Modify Bearer Request/Response (S531).

When the low-delay service application is terminated in a C-DRX deactivated state (C-DRX OFF), the terminal 100 transmits a PDN Disconnectivity Request (S540). The PDN Disconnectivity Request is transferred to the AMF/MME (210).

The AMF/MME 210 transmits a Delete Session Request to the SMF/P-GW 230 (S541).

The SMF/P-GW 230 transmits an authentication request (Credit Control Request, CCR-T) for terminating a session to the PCF 250 (S542), and receives an authentication response (Credit Control Answer, CCA-T) from the PCF 250 (S543).

The SMF/P-GW 230 transmits a Delete Session Response to the AMF/MME 210 (S544).

The AMF/MME 210 transmits an E-RAB Release Request to the base station 200 (S545).

The AMF/MME 210 transmits a Deactivate EPS bearer Context Request to the terminal 100 (S546).

The base station 200 transmits an RRC Connection Reconfiguration including a C-DRX setup request to the terminal 100 (S547).

The terminal 100 activates C-DRX (C-DRX ON) and transmits an RRC Connection Reconfiguration Complete to the base station 200 (S548).

The base station 200 transmits an E-RAB Release Response to the AMF/MME 210 (S549).

The terminal 100 transmits a Deactivate EPS bearer Context Accept to the AMF/MME 210 (S550).

Figure 8:
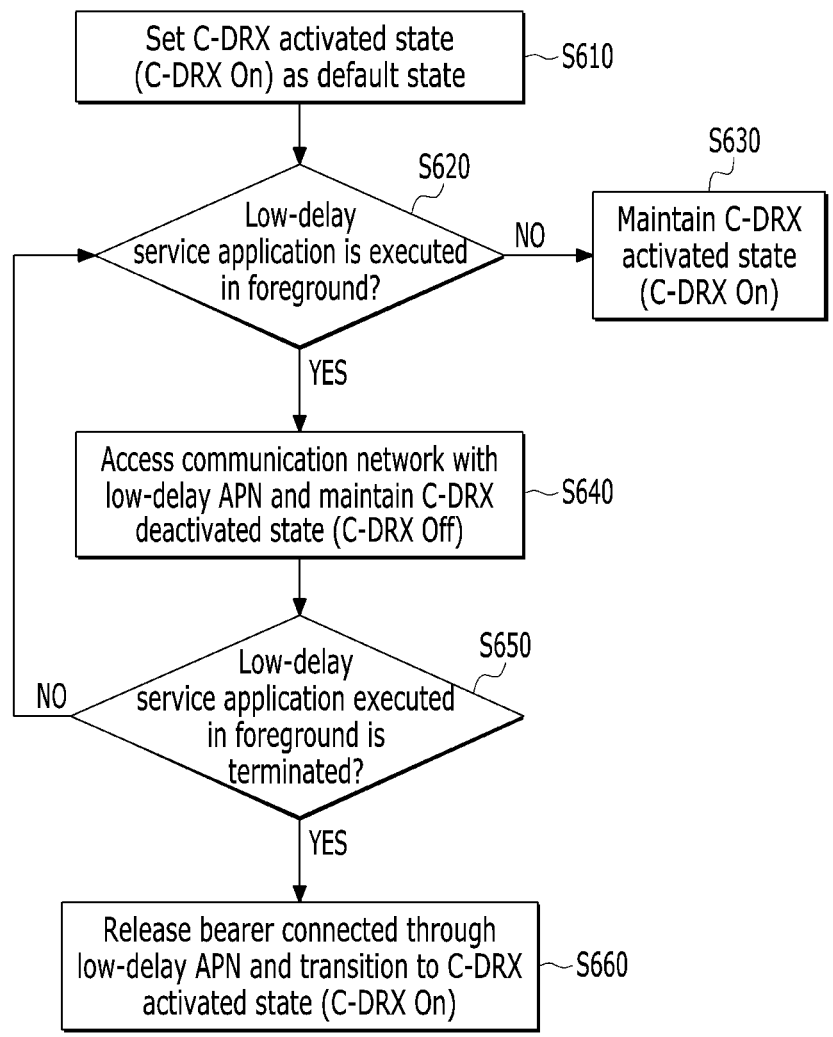
FIG. 8 is a flowchart showing a method for transitioning between C-DRX activated/deactivated states according to an application according to an embodiment.

FIG. 8 is a flowchart showing a method for transitioning between C-DRX activated/deactivated states according to an application according to an embodiment.

Referring to FIG. 8, a terminal 100 sets a C-DRX activated state (C-DRX On) as a default state while a C-DRX dynamic service is activated (S610).

The terminal 100 determines whether an application (low-delay service application) deactivating C-DRX (C-DRX Off) is executed in the foreground (S620).

The terminal 100 maintains the C-DRX activated state (C-DRX On) when the low-delay service application is not executed in the foreground (S630).

When the low-delay service application is executed in the foreground, the terminal 100 accesses a communication network with an APN (low-delay APN), which is connected when C-DRX is deactivated, and maintains the C-DRX deactivated state (C-DRX Off) (S640).

The terminal 100 monitors whether the low-delay service application executed in the foreground transitions to the background, and then determines whether the low-delay service application is terminated (S650). The terminal 100 may determine that the low-delay service application is terminated when a predetermined time (e.g. 120 seconds) has lapsed after the executed low-delay service application transitioned to the background.

When the low-delay service application is terminated, the terminal 100 releases a bearer connected through the low-delay APN and transitions to the C-DRX activated state (C-DRX On) (S660). When the low-delay service application is running, the terminal 100 determines whether the low-delay service application is still running in the foreground.

As described above, according to the present invention, battery consumption can be reduced while providing an ultra-low-delay service, by activating or deactivating C-DRX depending on a delay sensitivity of an application. In particular, a terminal can dynamically set so that a low-delay service application sensitive to a delay transmits and receives data in a C-DRX deactivated state (C-DRX Off), and so that a low-delay service application less sensitive to a delay transmits and receives data in a C-DRX activated state (C-DRX On).

The embodiment of the present invention described above is not implemented only through the apparatus and method, but may be implemented through a program for realizing a function corresponding to the configuration of the embodiment of the present invention or a recording medium in which the program is recorded.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A method for dynamically applying a battery saving technology by a terminal, the method comprising:
    transmitting, to an authentication server, a first message requesting an activation of a battery saving technology dynamic service;
    receiving, from the authentication server, a second message being a response to the first message, the second message indicating authentication success and at least one application to which the battery saving technology is not applied;
    transmitting and receiving data with a base station in a battery saving technology deactivated state, when the at least one application is executed; and
    switching to and maintaining a battery saving technology activated state when the at least one application is not executed.

2. The method of claim 1, wherein the second message comprises a list of applications to which the battery saving technology is not applied, and a first access point name (APN) used for accessing a network when an application included in the list of applications is executed.

3. The method of claim 2, wherein transmitting and receiving the data with the base station in the battery saving technology deactivated state comprises
    accessing the base station with the first APN when the application included in the list of applications is executed in the battery saving technology activated state, receiving a request for releasing the battery saving technology from the base station, and switching the battery saving technology activated state to the battery saving technology deactivated state.

4. The method of claim 3, wherein maintaining the battery saving technology activated state comprises releasing a bearer connected through the first APN when an execution of the application included in the list of applications is terminated, and receiving a request for setup of the battery saving technology from the base station.

5. The method of claim 4, further comprising accessing the base station with a second APN different from the first APN when an application not included in the list of applications is executed in the battery saving technology activated state.

6. The method of claim 1, wherein the at least one application to which the battery saving technology is not applied comprises a low-delay service application.

7. The method of claim 1, further comprising:

transmitting a third message requesting periodically a status check of the battery saving technology dynamic service based on a status query time, to the authentication server;

receiving a fourth message that is a response to the third message from the authentication server; and maintaining the battery saving technology dynamic service to be in an activated state when response information included in the fourth message comprises an authentication success, wherein the second message further comprises a state query time.

8. The method of claim 1, further comprising:

transmitting a fifth message requesting a deactivation of the battery saving technology dynamic service to the authentication server;

receiving a sixth message that is a response to the fifth message from the authentication server; and setting the battery saving technology dynamic service to a deactivated state when response information included in the sixth message comprises a deactivation success.

9. A method for applying dynamically a battery saving technology by a terminal, the method comprising:

storing a list of connected mode discontinuous reception (C-DRX) unapplied applications which transmit and receive data in a C-DRX deactivated state (C-DRX Off);

setting a C-DRX state to the C-DRX deactivated state (C-DRX Off) based on receiving, from an authentication server, an authentication success indication and at least one C-DRX unapplied application included in the list of C-DRX unapplied applications being executed; and switching the C-DRX state to a C-DRX activated state (C-DRX On) and maintaining the C-DRX activated state, when all applications included in the list of C-DRX unapplied applications are not executed.

10. The method of claim 9, wherein the at least one C-DRX unapplied application is a low-delay service application, and the list of C-DRX unapplied applications is received from the authentication server.

11. The method of claim 9, wherein a first application included in the list of C-DRX unapplied applications accesses a first base station with a first APN, and a second application not included in the list of C-DRX unapplied applications accesses a second base station with a second APN.

12. The method of claim 11, wherein the first APN is received from the authentication server.

13. The method of claim 11, wherein setting the C-DRX state to the C-DRX deactivated state (C-DRX Off) comprises accessing the first base station with the first APN when a C-DRX unapplied application included in the list of C-DRX unapplied applications is executed, receiving a C-DRX release request from the first base station, and switching the C-DRX state to the C-DRX deactivated state.

14. The method of claim 13, wherein setting the C-DRX state to the C-DRX activated state (C-DRX On) comprises releasing a bearer connected through the first APN when execution of the C-DRX unapplied application is terminated, receiving a C-DRX setup request from the first base station, and switching the C-DRX deactivated state to the C-DRX activated state.

15. A method for dynamically applying a battery saving technology by an authentication server, the method comprising:

receiving a first message requesting an activation of a battery saving technology dynamic service from a terminal; and transmitting a second message that is a response to the first message to the terminal, wherein the second message comprises a list of applications to which the battery saving technology is not applied, and a first access point name (APN) used for a network access when a first application included in the list of applications is executed, and wherein the first APN is an APN different from a second APN used for a network access when a second application not included in the list of applications is executed.

16. The method of claim 15, further comprising:

receiving a third message requesting periodically a status check of the battery saving technology dynamic service from the terminal, and transmitting a fourth message that is a response to the third message to the terminal, wherein the terminal maintains the battery saving technology dynamic service to be in an activated state when the fourth message comprises an authentication success.

17. The method of claim 15, further comprising:

receiving a fifth message requesting a deactivation of the battery saving technology dynamic service from the terminal, and transmitting a sixth message that is a response to the fifth message to the terminal, wherein the terminal sets the battery saving technology dynamic service to a deactivated state when the sixth message comprises a deactivation success.

18. A method for dynamically applying a battery saving technology by a base station, the method comprising:

receiving a request for accessing with a first APN from a terminal;

transmitting a first connected mode discontinuous reception (C-DRX) setup request including first C-DRX parameters to the terminal, and transmitting and receiving data with the terminal in a C-DRX activated state;

receiving a request for accessing with a second APN from the terminal; and transmitting a C-DRX release request to the terminal, and transmitting and receiving data with the terminal in a C-DRX deactivated state.

19. The method of claim 18, further comprising:
receiving a request for releasing a bearer connected through the second APN from the terminal, and
transmitting a second C-DRX setup request including second C-DRX parameters to the terminal.

20. The method of claim 18, wherein the second APN is an APN allocated to a C-DRX unapplied application.

* * * * *